(12) United States Patent
Shin et al.

(10) Patent No.: US 8,737,505 B2
(45) Date of Patent: May 27, 2014

(54) METHOD AND APPARATUS OF CODEBOOK TRANSFORMATION FOR INTERFERENCE MITIGATION IN CODEBOOK-BASED PRECODING

(75) Inventors: Wooram Shin, Daejeon (KR); Jihyung Kim, Daejeon (KR); Rong Ran, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 546 days.

(21) Appl. No.: 12/968,519

(22) Filed: Dec. 15, 2010

(65) Prior Publication Data

US 2011/0142149 A1  Jun. 16, 2011

(30) Foreign Application Priority Data

Dec. 15, 2009  (KR) .................. 10-2009-0124885
Jul. 5, 2010  (KR) .................. 10-2010-0064483

(51) Int. Cl.
*H04B 7/02*  (2006.01)
*H04L 1/02*  (2006.01)

(52) U.S. Cl.
USPC ............................ 375/267; 375/295; 375/346

(58) Field of Classification Search
CPC ............ H04L 25/0206; H04L 25/0228; H04L 25/0244
USPC ........................... 375/260, 267, 295, 316, 347
See application file for complete search history.

(56) References Cited

U.S. PATENT DOCUMENTS

| 2009/0325590 A1* | 12/2009 | Liu et al. ................ 455/452.2 |
| 2010/0002643 A1* | 1/2010 | Han et al. ................... 370/329 |
| 2010/0104033 A1* | 4/2010 | Gorokhov ................... 375/260 |
| 2010/0127931 A1* | 5/2010 | Rensburg et al. ............. 342/372 |
| 2010/0315970 A1* | 12/2010 | Ramamurthi et al. ........ 370/252 |
| 2011/0216817 A1* | 9/2011 | Kim et al. ................... 375/224 |

FOREIGN PATENT DOCUMENTS

KR  10-2009-0113230  10/2009

OTHER PUBLICATIONS

"Part 16: Air Interface for Fixed and Mobile Broadband Wireless Access Systems"; IEEE 802.16m-09/0010r2; Jun. 2009; pp. 1-333.

* cited by examiner

*Primary Examiner* — Chieh M Fan
*Assistant Examiner* — Freshteh N Aghdam
(74) *Attorney, Agent, or Firm* — Staas & Halsey LLP (57) ABSTRACT

When a transmitter communicating with a first receiver interferes with an adjacent second receiver, the transmitter receives a reference signal from the second receiver in order to transform a codebook to mitigate interference in the second receiver. A channel with the second receiver is estimated through the received reference signal, and a receiving correlation matrix is calculated based on the estimated channel. The inverse of the receiving correlation matrix is calculated from the calculated receiving correlation matrix, and the codebook is transformed using the calculated inverse of the receiving correlation matrix.

9 Claims, 5 Drawing Sheets

METHOD AND APPARATUS OF CODEBOOK TRANSFORMATION FOR INTERFERENCE MITIGATION IN CODEBOOK-BASED PRECODING

CROSS-REFERENCE TO RELATED APPLICATION

This application claims priority to and the benefit of Korean Patent Application No. 10-2009-0124885 and 10-2010-0064483 filed in the Korean Intellectual Property Office on Dec. 15, 2009 and Jul. 5, 2010, the entire contents of which are incorporated herein by reference.

BACKGROUND OF THE INVENTION (a) Field of the Invention

The present invention relates to a method and apparatus of codebook transformation in codebook-based multiple-input multiple-output (MIMO) precoding. More particularly, the present invention relates to a method and apparatus of codebook transformation for interference mitigation.

(b) Description of the Related Art

MIMO technology using multiple antennas is a communication scheme that improves channel capacity by generating a multiplexing gain or diversity gain from spatial freedom. Such MIMO technology can be divided into an open-loop scheme and a closed-loop scheme according to the use of a channel or channel-related information at the time of signal transmission.

The closed-loop scheme has a higher channel capacity than the open-loop scheme because it performs a precoding process using channel information for signal transmission. Also, it is necessary for a transmitter to acquire channel information between the transmitter and a receiver when transmitting a signal using the closed-loop MIMO technology, and there are various methods for acquiring channel information. For instance, there is a method in which a codebook representing a channel is defined, and a codeword having an optimum relationship with the channel measured at a receiver (e.g., the highest of intrinsic absolute values between a channel vector and a codeword vector or the highest Frobenius norm of a product of a channel matrix and a codeword matrix) is fed back to a transmitter.

A codeword, which is an element of the codebook, is indexed by a representative value of bits, and a value fed back to each transmitter is a bit value corresponding to a selected codeword. In order to use such a codebook-based precoding scheme, a codebook designed according to channel characteristics and a restriction on the number of feedback bits is required.

However, since the number of feedback bits is limited, it is not possible to design a codebook reflecting all of various channel characteristics. Accordingly, a method in which a codebook is designed for a channel with no correlation and the codebook is transformed for a highly correlated channel at long intervals was devised. This was devised using the fact that correlation characteristics of a channel do not change rapidly over time.

On the other hand, signal transmission using the closed-loop MIMO transmission shows superior performance to the open-loop MIMO transmission if no adjacent communication device where interference may occur exists. However, if an adjacent communication device where interference may occur exists, the closed-loop scheme may induce significant interference in the adjacent communication device, and the sum of transmission efficiencies including the transmission efficiency of the adjacent communication device is reduced, thus rendering the advantages of the closed-loop scheme meaningless.

Therefore, a closed-loop precoding scheme that takes into account interference in an adjacent communication device was proposed. Particularly, techniques such as precoding matrix index (PMI) restriction/recommendation/combination schemes for the codebook-based precoding scheme were proposed.

However, the proposed techniques are only applicable to a basic codebook to which codebook transformation is not applied. Thus, a channel where performance degradation occurs due to limitations of codebook design cannot eliminate interference in an adjacent communication device, or even if a codebook transformation technique is applied, its performance gain is not large. Subsequently, in order to overcome or make up for these problems, codebook transformation considering interference in an adjacent communication device is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus of codebook transformation for interference mitigation in codebook-based MIMO precoding.

An exemplary embodiment of the present invention provides a method of codebook transformation, in which, when a transmitter communicating with a first receiver interferes with an adjacent second receiver, the transmitter transforms a codebook for mitigating interference in the second receiver, the method including:

receiving a reference signal from the second receiver; estimating a channel with the second receiver through the received reference signal; calculating a receiving correlation matrix based on the estimated channel; calculating the inverse of the receiving correlation matrix from the calculated receiving correlation matrix; and transforming the codebook using the calculated inverse of the receiving correlation matrix.

Another exemplary embodiment of the present invention provides a method of codebook transformation when a transmitter communicating with a first receiver interferes with an adjacent second receiver, the method including:

the second receiver receiving a transmitting correlation matrix measurement request message from the transmitter or the first receiver; the second receiver receiving a reference signal from the transmitter; the second receiver estimating a channel from the transmitter to the second receiver based on the reference signal; the second receiver calculating a transmitting correlation matrix based on the estimated channel; and quantizing the transmitting correlation matrix and transmitting the quantized transmitting correlation matrix to the first receiver.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

Hereinafter, a method and apparatus for codebook transformation according an exemplary embodiment of the present invention will be described in detail.

Figure 1:
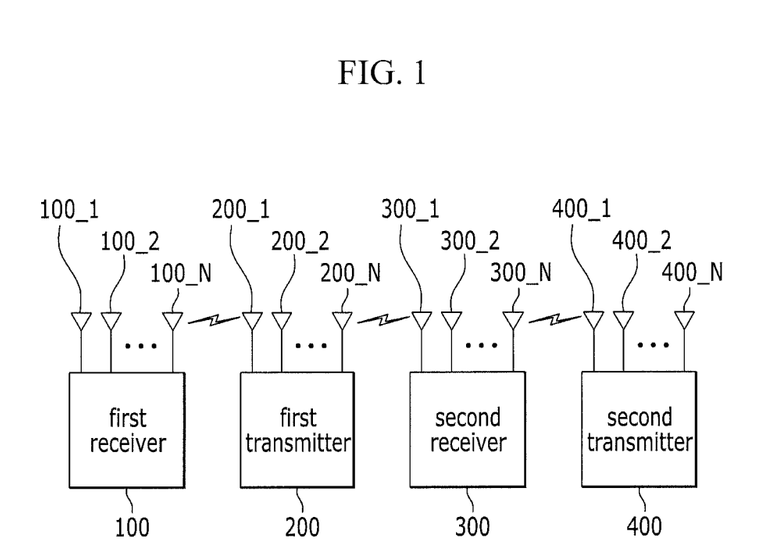
FIG. 1 is an illustration showing a communication environment where interference exists according to an exemplary embodiment of the present invention.

FIG. 1 is an illustration showing a communication environment where interference exists according to an exemplary embodiment of the present invention.

As shown in FIG. 1, a first transmitter 200 and a second transmitter 400 have multiple antennas 200-1 to 200-N and 400-1 to 400-N, and a first receiver 100 and a second receiver 300 have multiple antennas 100-1 to 100-N and 300-1 to 300-N or a single antenna 100-1 and 300-1. In the case where the first receiver 100 and the second receiver 300 respectively transmit a signal to the first transmitter 200 and the second transmitter 400, the first receiver 100 and the second receiver 300 become transmitters and the first transmitter 200 and the second transmitter 400 become receivers. That is, each communication device serves as a transmitter or a receiver from the perspectives of transmission and reception.

It is assumed that the first transmitter 200 communicates with the first receiver 100 and the second transmitter 400 communicates with the second receiver 300. At this point, the first transmitter 200 and the second transmitter 400 simultaneously transmit a signal to the first receiver 100 and the second receiver 300, respectively, on the same frequency resource. However, if the first transmitter 200 is located within a distance where it can interfere with the first receiver 100, the second receiver 300 may be interfered with by the first transmitter 200 and the performance of decoding or detecting a signal transmitted from the second transmitter 400 may be degraded.

Accordingly, a description will be made with reference to FIGS. 2 to 5 regarding a method and transmitter of codebook transformation for mitigating interference in an adjacent communication device in the case of employing a codebook-based closed-loop precoding scheme in order to mitigate interference in the second receiver 300 caused by the first transmitter 200.

To begin with, a structure of a transmitter for transforming a codebook to mitigate interference in a receiver will be described with reference to FIG. 2.

Figure 2:
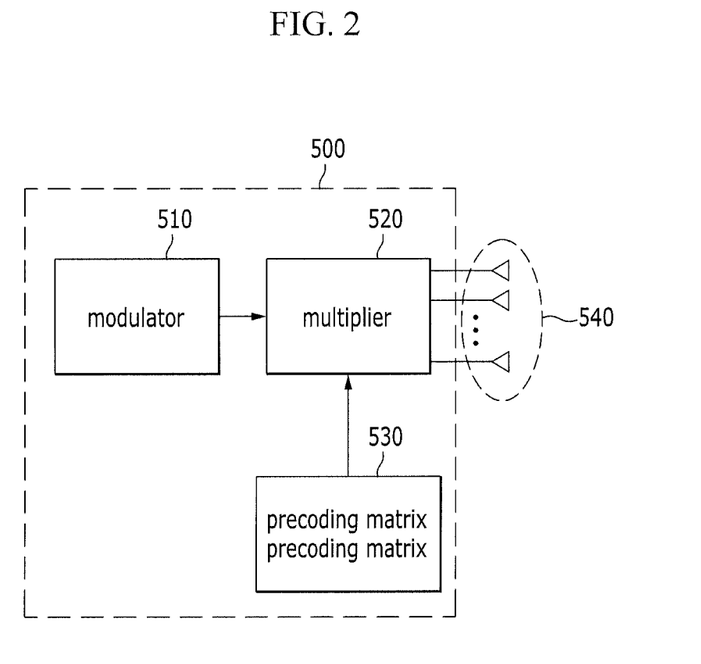
FIG. 2 is a structural view of a transmitter to which codebook transformation is applied according to an exemplary embodiment of the present invention.

FIG. 2 is a structural view of a transmitter to which codebook transformation is applied according to an exemplary embodiment of the present invention.

As shown in FIG. 2, a transmitter 500 includes a modulator 510, a multiplier 520, and a precoding matrix processor 530.

The modulator 510 generates a symbol vector. A method of generating a symbol vector is a well-known method, so a detailed description thereof will be omitted in the exemplary embodiment of the present invention.

The precoding matrix processor 530 obtains a precoding matrix whose codebook is transformed using a precoding matrix obtained from PMI, a first codebook transformation matrix, and a second codebook transformation matrix. A method of obtaining a precoding matrix to which codebook transformation is applied will be described later.

The multiplier 520 generates a transmission signal vector by multiplying a symbol vector generated by the modulator 510 by a precoding matrix generated by the precoding matrix processor 530. The thus-generated transmission signal vector is transmitted to a receiver through multiple antennas 540.

Figure 4:
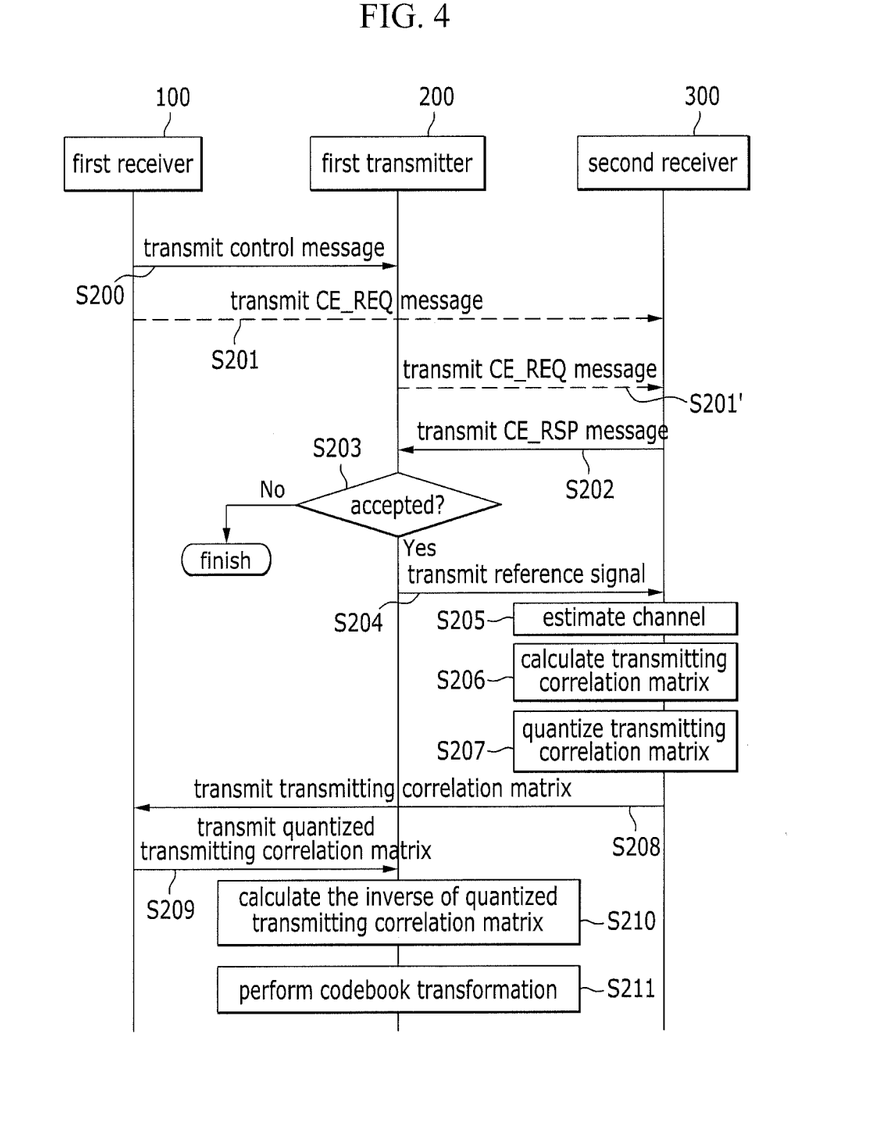
FIG. 4 is a flowchart showing a procedure of codebook transformation for interference mitigation in codebook-based MIMO precoding according to a second exemplary embodiment of the present invention.
Figure 5:
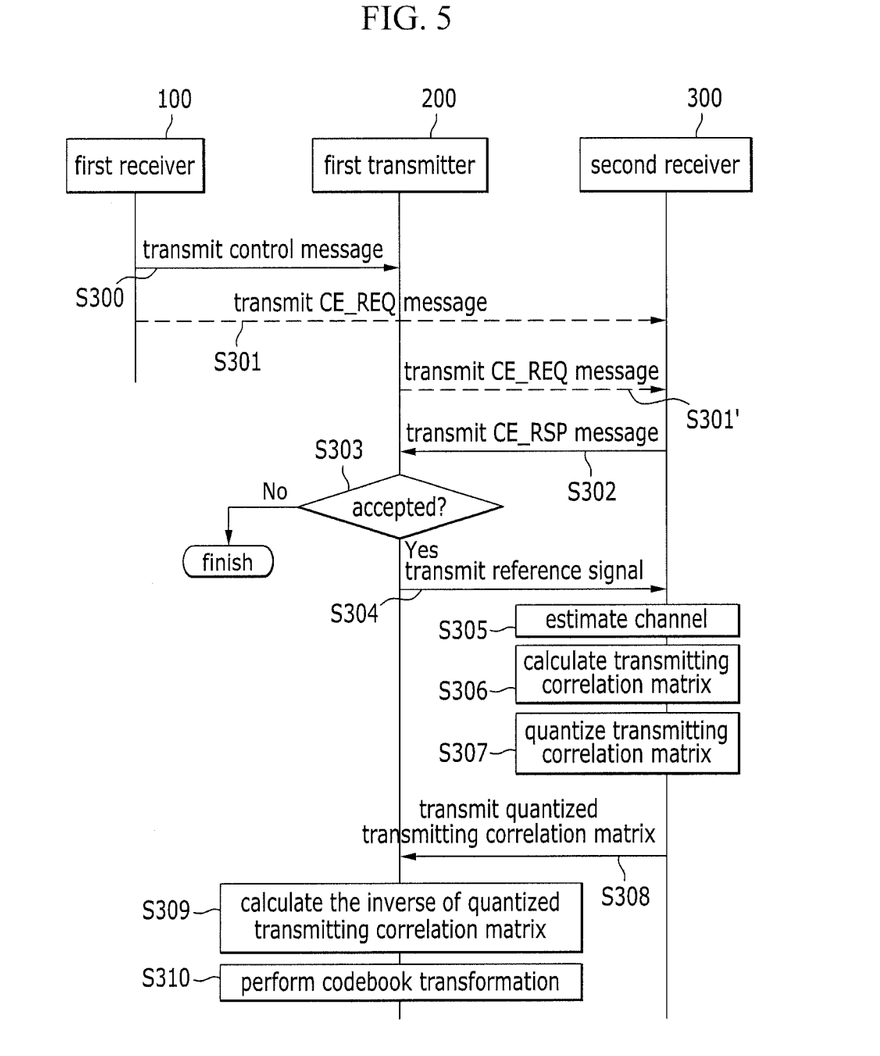
FIG. 5 is a flowchart showing a procedure of codebook transformation for interference mitigation in codebook-based MIMO precoding according to a third exemplary embodiment of the present invention.

A description will be made with reference to FIGS. 3 to 5 regarding a method of codebook transformation for mitigating interference in the second receiver 300 caused by the first transmitter 200 in the environment of FIG. 1 where the transmitter shown in FIG. 2 is located.

Figure 3:
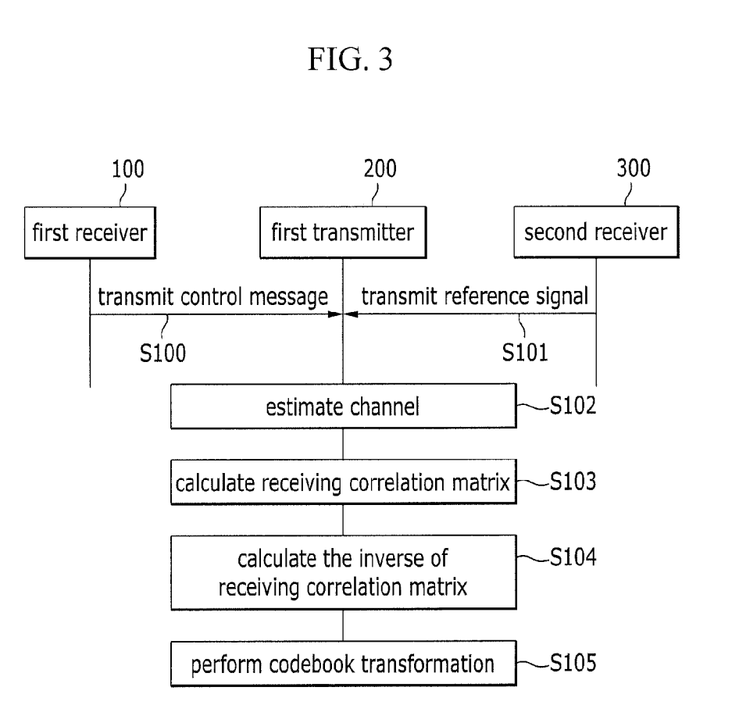
FIG. 3 is a flowchart showing a procedure of codebook transformation for interference mitigation in codebook-based MIMO precoding according to a first exemplary embodiment of the present invention.

FIG. 3 is a flowchart showing a procedure of codebook transformation for interference mitigation in codebook-based MIMO precoding according to a first exemplary embodiment of the present invention. FIG. 4 is a flowchart showing a procedure of codebook transformation for interference mitigation in codebook-based MIMO precoding according to a second exemplary embodiment of the present invention, and FIG. 5 is a flowchart showing a procedure of codebook transformation for interference mitigation in codebook-based MIMO precoding according to a third exemplary embodiment of the present invention.

First, as shown in FIG. 3, the first exemplary embodiment of the present invention involves acquiring channel information required for codebook transformation for interference mitigation between adjacent communication devices from a reference signal transmitted to the first transmitter 200 from the second receiver 300.

In general, the reference signal is a sounding signal in terms of downlink, whilst the reference signal is a preamble signal or midamble signal in terms of uplink. However, the reference signal according to the first exemplary embodiment of the present invention is a reference signal for channel estimation with an adjacent base station causing interference, rather than a channel with a serving base station, and it has to be orthogonal to a reference signal for the serving base station or has to be separate therefrom.

The first receiver 100 transmits a codebook transformation execution command message (hereinafter referred to as "CT_CMD" for convenience of explanation) and an adjacent communication device interference mitigation execution command message (hereinafter referred to as "IM_CMD" for convenience of explanation) to the first transmitter 200 (S100). In the case of a cellular system, a base station transmits CT_CMD and IM_CMD to a user terminal.

When the first receiver 100 transmits CT_CMD and IM_CMD to the first transmitter 200, the second receiver 300 transmits a reference signal for channel estimation to the first transmitter 200 (S101). However, a reference signal to be transmitted to the first transmitter 200 from the second receiver 300 and a reference signal to be transmitted to the first transmitter 200 from the first receiver 100 have to be orthogonal to each other or separate from each other.

When the first transmitter 200 receives CT_CMD and IM_CMD from the first receiver 100 and a reference signal from the second receiver 300, a channel from the second receiver 300 to the first transmitter 200 is estimated by using the reference signal to be transmitted to the first transmitter 200 from the second receiver 300 (S102). A MIMO channel matrix obtained by estimating a channel from the second receiver 300 to the first transmitter 200 at the k-th time is defined as $H_{300 \to 200}(k)$. Then, a value of the j-th column of the i-th row in the channel matrix $H_{300 \to 200}(k)$ denotes a channel value when a signal is transmitted from the j-th antenna of the second receiver 300 to the i-th antenna of the first transmitter 200.

When the first transmitter 200 estimates a channel in step S102, a receiving correlation matrix is calculated through the estimated channel (S103). It can be assumed that the receiving correlation matrix is equal to a transmitting correlation matrix from the first transmitter 200 to the second receiver 300.

If a receiving correlation matrix for the channel from the second receiver 300 to the first transmitter 200 at the k-th time is denoted by $\overline{R}_{300 \to 200}(k)$, a method of obtaining the receiving correlation matrix is as shown in Equation 1.

$$\overline{R}_{300 \to 200}(k) = \beta \overline{R}_{300 \to 200}(k-1) + (1-\beta) H_{300 \to 200}(k) H_{300 \to 200}(k)^H \quad \text{(Equation 1)}$$

where $\beta$ is a variable for adjusting the degree of reflection of the past and current values. The higher the value of $\beta$, the less the degree of reflection of the current value, thereby producing an averaging effect for a long period. Herein, R(k−1) is the past value, and H(k) is the current value.

When the receiving correlation matrix is obtained in step S103, the inverse of the corresponding receiving correlation matrix is obtained (S104). If a codebook transformation matrix for mitigating interference in the second receiver 300 caused by the first transmitter 200 is denoted by $T_{200 \to 300}(k)$, the codebook transformation matrix becomes the inverse of the receiving correlation matrix obtained in step S103. The inverse of the receiving correlation matrix is as shown in Equation 2.

$$T_{200 \to 300}(k) = \overline{R}_{300 \to 200}(k)^{-1} \quad \text{(Equation 2)}$$

When codebook transformation is performed using the inverse matrix shown in Equation 2, the interference in the second receiver 300 can be mitigated by removing the degree of transmission correlation of the channel from the first transmitter 200 to the second receiver 300. That is, if the channel is whitened by removing the correlation component of the codebook by codebook transformation, the degree of transmission correlation of the channel is removed.

After obtaining the inverse matrix in step S104, the codebook is transformed with a codebook transformation matrix (S105). If interference in an adjacent communication device is not taken into account, only a receiving correlation matrix from the first receiver 100 to the first transmitter 200 is used in the case of codebook transformation. At this point, since the first transmitter 200 is in communication with the first receiver 100, the first receiver 100 has to have as large a channel gain as possible.

Accordingly, a codebook transformation matrix $T_{200 \to 100}(k)$ at the k-th time for this can be obtained as in Equation 3.

$$T_{200 \to 100}(k) = \overline{R}_{100 \to 200}(k) = \beta \overline{R}_{100 \to 200}(k-1) + (1-\beta) H_{100 \to 200}(k) H_{100 \to 200}(k)^H \quad \text{(Equation 3)}$$

where $\overline{R}_{100 \to 200}(k)$ presents a receiving correlation matrix for the channel between the first receiver 100 and the first transmitter 200 at the k-th time, and $H_{100 \to 200}(k)$ represents a channel matrix from the first transmitter 200 to the first receiver 100 estimated at the k-th time.

At the time of codebook transformation, a codeword matrix obtained from PMI is multiplied by a linear combination matrix of the codebook transformation matrix $T_{200 \to 100}(k)$ for maximizing the channel gain of the first receiver 100 and the codebook transformation matrix $T_{200 \to 300}(k)$ for minimizing interference in the second receiver 300, thereby performing transformation. If a precoding matrix obtained from PMI at the k-th time before executing codebook transformation is denoted by W(k), the final precoding matrix $\tilde{W}(k)$ for the k-th time after executing codebook transformation is as shown in the following Equation 4.

$$\tilde{W}(k) = \text{ColumnWiseNormalization}\{(\alpha T_{200 \to 100}(k) + (1-\alpha) T_{200 \to 300}(k)) W(k)\} \quad \text{(Equation 4)}$$

where $\alpha$ can be determined by an interference-over-thermal (IoT) noise ratio or by a signal-to-interference plus noise ratio (SINR). Alternatively, $\alpha$ may be determined by virtual SINR or by carrier-to-interference plus noise ratio (CINR), or $\alpha$ may be determined by long-period statistics of a channel, such as path loss plus shadowing. A definition of ColumnWiseNormalization{•} is as shown in the following Equation 5.

$$\text{ColumnWiseNormalization}\{A\} = a_i / \|a_i\|, \text{ for } \forall i \quad \text{(Equation 5)}$$

where A is an arbitrary matrix, and a column vector $a_i$ is the i-th column of matrix A. And, $\|\cdot\|$ represents a norm operation.

In the case that unitary precoding has to be performed, Equation 4 is replaced by the following Equation 6.

$$\tilde{W}(k) = QRD\{(\alpha T_{200 \to 100}(k) + (1+\alpha) T_{200 \to 300}(k)) W(k)\} \quad \text{(Equation 6)}$$

where an output value of QRD{•} corresponds to the Q matrix after QR-decomposition is performed.

A procedure of codebook transformation according to another exemplary embodiment of the present invention will be described with reference to FIG. 4. When the first receiver 100 transmits CT_CMD and IM_CMD to the first transmitter 200 (S200), the first receiver 100 transmits, to the second receiver 300, a transmitting correlation matrix measurement request message CE_REQ for the channel from the first transmitter 200 to the second receiver 300 (S201). Here, the CE_REQ transmitted to the second receiver 300 may be transmitted by the first transmitter 200 instead of the first receiver 100 (S201').

When the second receiver 300 has received the CE_REQ, the second receiver 300 determines whether codebook transformation for interference mitigation may provide performance improvement. Here, the criteria for determining whether performance improvement is possible is a value of any one of predicted interference-over-thermal (IoT) noise, signal-to-interference plus noise ratio (SINR), and channel capacity change. If it is determined that codebook transformation can provide performance improvement, an acceptance message is delivered to the first transmitter 200, and if not, a rejection message is delivered to the first transmitter 200 in the form of a response message CE_RSP (S202).

The first transmitter 200 determines whether the CE_RSP received from the second receiver 300 is a CE_RSP indicative of an acceptance message or a CE_RSP indicative of a rejection message (S203). If the first transmitter 200 has received the CE_RSP indicative of an acceptance message, the first transmitter 200 transmits a reference signal for channel estimation to the second receiver 300 (S204). At this point, the reference signal transmitted from the first transmitter 200 to the second receiver 300 and a reference signal transmitted from the second transmitter 400 to the second receiver 300 may be orthogonal to each other, or separate from each other.

If the second receiver 300 has transmitted the CE_RSP indicative of an acceptance message to the first transmitter 200 at the time of transmission of the CE_RSP in step S202, the second receiver 300 estimates a channel between the first transmitter 200 and the second receiver 300 by using the reference signal received from the first transmitter 200 (S205).

It is assumed that a channel matrix obtained by estimating a channel from the first transmitter 200 to the second receiver 300 at the k-th time is $H_{200 \to 300}(k)$. A value of the j-th column of the i-th row of the matrix $H_{200 \to 300}(k)$ is a channel value when the i-th antenna of the second receiver 300 receives a signal sent from the j-th antenna of the first transmitter 200.

The second receiver 300 obtains a transmitting correlation matrix by using the channel estimated in step S205 (S206). If a transmitting correlation matrix for the channel from the first transmitter 200 to the second receiver 300 at the k-th time is denoted by $\hat{R}_{200 \to 300}(k)$, an equation for obtaining the transmitting correlation matrix is as follows.

$$\hat{R}_{200 \to 300}(k) = \beta \hat{R}_{200 \to 300}(k-1) + (1-\beta) H_{200 \to 300}(k)\,^H H_{200 \to 300}(k) \quad \text{(Equation 7)}$$

where $\beta$ is a variable for adjusting the degree of reflection of the past and current values. The higher the value of $\beta$, the less the degree of reflection of the current value, thereby producing an averaging effect for a long period.

When the transmitting correlation matrix is obtained in step S206, the second receiver 300 quantizes the transmitting correlation matrix $\hat{R}_{200 \to 300}(k)$ (S207). At this point, the quantized transmitting correlation matrix is denoted by $\check{R}_{200 \to 300}(k)$. And, the quantized transmitting correlation matrix is transmitted to the first receiver 100 (S208). Having received the quantized transmitting correlation matrix from the second receiver 300, the first receiver 100 delivers the received quantized transmitting correlation matrix to the first transmitter 200 (S209).

The following is the case where the quantized transmitting correlation matrix needs to be transmitted to the first transmitter 200 through the first receiver 100 without being transmitted directly to the first transmitter 200 by the second receiver 300. When it is assumed that, in a cellular system, the first receiver 100 and the second receiver 300 are base stations and the first transmitter 200 is a terminal using the first receiver 100 as a serving base station, the second receiver 300 cannot directly communicate with the first transmitter 200 because the base stations are connected via a backhaul network. Therefore, the second receiver 300 transmits information to be delivered to the first transmitter 200 to the first receiver 100, and the first receiver 100 delivers it to the first transmitter 200.

When the first transmitter 200 receives the quantized transmitting correlation matrix from the first receiver 100, the first transmitter 200 obtains the inverse of the received matrix $\check{R}_{200 \to 300}(k)$ (S210). If a codebook transformation matrix for mitigating interference in the second receiver 300 caused by the first transmitter 200 at the k-th time is denoted by $T_{200 \to 300}(k)$, the codebook transformation matrix is the inverse of a receiving correlation. The codebook transformation matrix is as follows.

$$T_{200 \to 300}(k) = \check{R}_{200 \to 300}(k)^{-1} \quad \text{(Equation 8)}$$

As seen in step S210, the codebook transformation matrix, which is the inverse of the transmitting correlation matrix $\check{R}_{200 \to 300}(k)$ is obtained, and then codebook transformation is performed (S211). The codebook transformation performed in step S211 is identical to the procedure of codebook transformation performed in step S105 of FIG. 3.

A procedure of codebook transformation according to another exemplary embodiment of the present invention will be described with reference to FIG. 5. The first receiver 100 transmits CT_CMD and IM_CMD to the first transmitter 200 (S300). The first receiver 100 transmits, to the second receiver 300, a transmitting correlation matrix measurement request message CE_REQ for the channel from the first transmitter 200 to the second receiver 300 (S301). Here, the CE_REQ transmitted to the second receiver 300 may be transmitted by the first transmitter 200 instead of the first receiver 100 (S301').

When the second receiver 300 has received the CE_REQ, the second receiver 300 determines whether codebook transformation for interference mitigation may provide performance improvement. If it is determined that codebook transformation can provide performance improvement, an acceptance message is delivered to the first transmitter 200, and if not, a rejection message is delivered to the first transmitter 200 in the form of a response message CE_RSP (S302).

The first transmitter 200 determines whether the CE_RSP received from the second receiver 300 is a CE_RSP indicative of an acceptance message or a CE_RSP indicative of a rejection message (S303). If the first transmitter 200 has received the CE_RSP indicative of an acceptance message, the first transmitter 200 transmits a reference signal for channel estimation to the second receiver 300 (S304). At this point, the reference signal transmitted from the first transmitter 200 to the second receiver 300 and a reference signal transmitted from the second transmitter 400 to the second receiver 300 may be orthogonal to each other, or separate from each other.

If the second receiver 300 has transmitted the CE_RSP indicative of an acceptance message to the first transmitter 200 at the time of transmission of the CE_RSP in step S202, the second receiver 300 estimates a channel between the first transmitter 200 and the second receiver 300 by using the reference signal received from the first transmitter 200 (S305).

It is assumed that a channel matrix obtained by estimating a channel from the first transmitter 200 to the second receiver 300 at the k-th time is $H_{200 \to 300}(k)$. A value of the j-th column of the i-th row of the matrix $H_{200 \to 300}(k)$ is a channel value when the i-th antenna of the second receiver 300 receives a signal sent from the j-th antenna of the first transmitter 200.

The second receiver 300 recursively obtains a transmitting correlation matrix by using the channel estimated in step S305 (S306). If a transmitting correlation matrix for the channel from the first transmitter 200 to the second receiver 300 at the k-th time is denoted by $\hat{R}_{200 \to 300}(k)$, an equation for obtaining the transmitting correlation matrix is as follows.

$$\hat{R}_{200 \to 300}(k) = \beta \hat{R}_{200 \to 300}(k-1) + (1-\beta) H_{200 \to 300}(k)\,^H H_{200 \to 300}(k) \quad \text{(Equation 9)}$$

where $\beta$ is a variable for adjusting the degree of reflection of the past and current values. The higher the value of $\beta$, the less the degree of reflection of the current value, thereby producing an averaging effect for a long period.

When the transmitting correlation matrix is obtained in step S306, the second receiver 300 quantizes the transmitting correlation matrix $\hat{R}_{200 \to 300}(k)$ (S307). At this point, the quantized transmitting correlation matrix is defined as $\check{R}_{200 \to 300}(k)$. And, the quantized transmitting correlation matrix is transmitted to the first transmitter 200 (S308).

When the first transmitter 200 receives the quantized transmitting correlation matrix from the second receiver 300, the first transmitter 200 obtains the inverse of the received matrix $\tilde{R}_{200\to300}(k)$ (S309). If a codebook transformation matrix for mitigating interference in the second receiver 300 caused by the first transmitter 200 at the k-th time is denoted by $T_{200\to300}(k)$, the codebook transformation matrix is the inverse of a receiving correlation. The codebook transformation matrix is as follows.

$$T_{200\to300}(k)=\tilde{R}_{200\to300}(k)^{-1} \quad \text{(Equation 10)}$$

As seen in step S309, the codebook transformation matrix, which is the inverse of the transmitting correlation matrix $\tilde{R}_{200\to300}(k)$ is obtained, and then codebook transformation is performed (S310). The codebook transformation performed in step S310 is identical to the procedure of codebook transformation performed in step S105 of FIG. 3 and step S211 of FIG. 4.

According to the exemplary embodiments of the present invention, it is possible to prevent performance degradation occurring during codebook-based closed-loop MIMO transmission considering interference in an adjacent communication device by codebook transformation, and to increase performance by facilitating interference mitigation between adjacent communication devices.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of codebook transformation, in which, when a transmitter communicating with a first receiver interferes with an adjacent second receiver, the transmitter transforms a codebook for mitigating interference in the second receiver, the method comprising
   receiving a reference signal from the second receiver;
   estimating a channel with the second receiver through the received reference signal;
   calculating a receiving correlation matrix based on the estimated channel;
   calculating the inverse of the receiving correlation matrix from the calculated receiving correlation matrix; and
   transforming the codebook using the calculated inverse of the receiving correlation matrix.

2. The method of claim 1, wherein a codebook transformation execution command message and an interference mitigation execution command message are received from the first receiver before the receiving of a reference signal.

3. The method of claim 2, wherein the reference signal is a signal that can be orthogonal to a reference signal for the first receiver, or separate therefrom.

4. A method of codebook transformation when a transmitter communicating with a first receiver interferes with an adjacent second receiver, the method comprising:
   receiving, by the second receiver, a transmitting correlation matrix measurement request message from the transmitter or the first receiver;
   receiving, by the second receiver, a reference signal from the transmitter;
   estimating, by the second receiver, a channel from the transmitter to the second receiver based on the reference signal;
   calculating, by the second receiver, a transmitting correlation matrix based on the estimated channel; and
   quantizing, by the second receiver, the transmitting correlation matrix and transmitting the quantized transmitting correlation matrix to the first receiver.

5. The method of claim 4, wherein the receiving of a reference signal comprises transmitting, by the second receiver, a transmitting correlation matrix measurement response message to the transmitter.

6. The method of claim 5, further comprising:
   receiving, by the transmitter, the transmitting correlation matrix measurement response message from the second receiver;
   determining, by the transmitter, whether the transmitting correlation matrix measurement response message is an acceptance message; and
   if the transmitting correlation matrix measurement response message is an acceptance message, transmitting, by the transmitter, the reference signal to the second receiver.

7. The method of claim 4, further comprising,
   after the transmission to the first receiver:
   receiving, by the transmitter, the quantized transmitting correlation matrix from the first receiver;
   calculating, by the transmitter, the inverse of the received quantized transmitting correlation matrix; and
   transforming, by the transmitter, the codebook using the calculated inverse of the transmitting correlation matrix.

8. The method of claim 4, comprising transmitting, by the second receiver, the quantized transmitting correlation matrix to the transmitter.

9. The method of claim 8, comprising:
   receiving, by the transmitter, the quantized transmitting correlation matrix from the second receiver;
   calculating, by the transmitter, the inverse of the received quantized transmitting correlation matrix; and
   transforming, by the transmitter, the codebook using the calculated inverse of the transmitting correlation matrix.

* * * * *